United States Patent [19]

Furukawa et al.

[11] Patent Number: 4,835,642
[45] Date of Patent: May 30, 1989

[54] MAGNETIC HEAD ASSEMBLY FOR DOUBLE-SIDED DISK DRIVE APPARATUS

[75] Inventors: Masatoshi Furukawa, Nagaoka; Masao Kumagai; Tadami Sugawara, both of Furukawa; Hatsuo Sasaki; Yuichi Hishi, both of Miyagi; Atsushi Takahashi, Furukawa, all of Japan

[73] Assignee: Alps Electric Co., Ltd., Japan

[21] Appl. No.: 229,749

[22] Filed: Aug. 3, 1988

Related U.S. Application Data

[63] Continuation of Ser. No. 920,841, Oct. 17, 1986, abandoned.

[30] Foreign Application Priority Data

Oct. 19, 1985 [JP] Japan .......................... 60-159256[U]

[51] Int. Cl.$^4$ ........................ G11B 5/54; G11B 21/21; G11B 21/22
[52] U.S. Cl. ..................................... 360/105; 360/104
[58] Field of Search ................. 360/104, 105, 106, 97, 360/99

[56] References Cited

U.S. PATENT DOCUMENTS

| | | | |
|---|---|---|---|
| 4,379,315 | 4/1983 | Schuler | 360/105 |
| 4,611,257 | 9/1986 | Shiroyama et al. | 360/104 |
| 4,625,249 | 11/1986 | Iwata | 360/104 |
| 4,651,245 | 3/1987 | Kanno | 360/104 |

FOREIGN PATENT DOCUMENTS 58-43826 9/1983 Japan .

Primary Examiner—Robert S. Tupper
Attorney, Agent, or Firm—Guy W. Shoup; Paul J. Winters

[57] ABSTRACT

A magnetic head assembly including a carriage which carries thereon a first magnetic head for information writing and reading to and from one side of a disc-like magnetic recording medium, and a hold case which carries thereon a second magnetic head for information writing and reading to and from the other side of the magnetic recording medium, the second magnetic head being disposed in a position opposed to the first magnetic head, the hold case being connected to the carriage through hinge means rotatably to a certain degree relative to the carriage, and the magnetic head assembly being reciprocated in a radial direction of the magnetic recording medium. The first magnetic head is mounted on the carriage through a gimbal spring which is formed rotatably to a certain degree with respect to biaxial hinge portions, and the second magnetic head is mounted on the hold case through a spring plate which is formed rotatably to a certain degree with respect to a uniaxial hinge portion. The hold case is urged toward the carriage on the side of the hinge means rotatably to a certain degree relative to the carriage.

5 Claims, 6 Drawing Sheets

MAGNETIC HEAD ASSEMBLY FOR DOUBLE-SIDED DISK DRIVE APPARATUS

This application a continuation of application Ser. No. 920,841, filed Oct. 17, 1986, now abandoned.

BACKGROUND OF THE INVENTION

1. Field of the Invention

The present invention relates to a magnetic head assembly in a double-side recording type disc driving apparatus capable of reading and writing information at both sides of a disc-like magnetic recording medium.

2. Description of the Prior Art

As to a double-side recording type disc driving apparatus which performs reading and writing of information at both sides of a disc-like magnetic recording medium (hereinafter referred to simply as "disc"), there are three types according to which position a magnetic head supported by a gimbal spring is disposed. They are a lower fixed, upper movable type in which the gimbal spring is disposed on the carriage side; an upper fixed, lower movable type in which the gimbal spring is disposed on the hold case side; and an upper movable, lower movable type in which the gimbal spring is provided on both carriage and hold case sides.

As an example of the upper movable, lower movable type, there is the invention disclosed in Japanese Patent Publication No. 43826/1983, which invention has been effected with a view to improving the follow-up performance of a magnetic head to thereby prevent off-track. An outline thereof will now be explained with reference to FIGS. 9 and 10 which are a longitudinal sectional view of a conventional magnetic head supporting device and a bottom view of a fore end portion of a magnetic head supporting movable base as viewed from the disc side, respectively.

Figure 9:
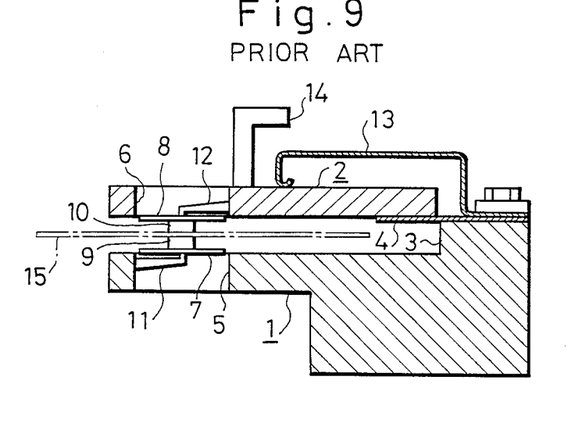
FIG. 9 is a sectional view of a magnetic head supporting device (magnetic head assembly)
Figure 10:
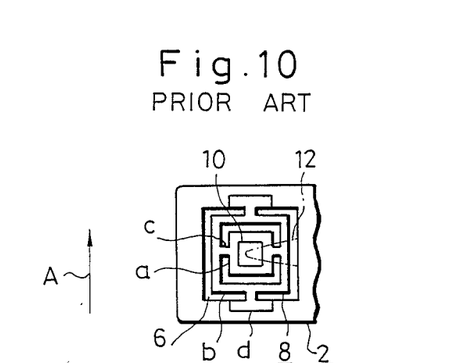
FIG. 10 is a bottom view of principal components of a fore end portion of a hold case.

In those figures, the magnetic head supporting device is mainly composed of a fixed base 1, a movable base 2 attached to a seat 3 of the fixed base 1 rotatably only within a certain range by means of a spring, and magnetic heads 9 and 10 mounted on fore end portions of the fixed base 1 and movable base 2, respectively. More specifically, the magnetic head 9 is attached through a gimbal spring 7 to a window portion 5 formed in the fixed base 1 and the magnetic head 10 is attached through a gimbal spring 8 to a window portion 6 formed in the movable base 2 so that heads are opposed to each other through a disc 15. Support pins 11 and 12 are in abutment with the backs of the gimbal springs 7 and 8 so that the magnetic heads 9 and 10 cannot move back from predetermined positions. Further, a fore end portion of a pressure spring 13 is in abutment with an upper surface of the movable base 2 to compress the latter toward the fixed base 1. A lifting hook 14 is projecting from the fore end side of the movable base 2 whereby the base 2 can be moved toward and away from the fixed base 1. As shown in FIG. 10, the gimbal spring 8 which supports the upper magnetic head 10 is obtained by punching a single thin-walled spring material to form a square portion "a" at a central portion and a square frame "b" at a peripheral edge portion, the square portion "a" and the square frame "b" being interconnected through a pair of narrow portions "c". Tongue pieces "d" are projecting from the square frame "b" in directions perpendicular to the narrow portions "c", and through the tongue pieces "d" the gimbal spring is bonded and fixed to the movable base 2. The gimbal spring 7 which supports the lower magnetic head 9 is of the same construction as the gimbal spring 8.

In the conventional magnetic head supporting device (magnetic head assembly) having the gimbal springs 7 and 8 of the above structure, when the magnetic heads 9 and 10 come into sliding contact with the upper surface of the disc 15 which is rotating at high speed in the direction of arrow A, an undulating phenomenon of particularly the square frame "b" may be developed by a frictional force generated between the heads and the disc. The undulating phenomenon causes resonance in an audible range of frequency band and this resonance may cause a so-called head squeak which involves an audible sound. According to one example of the method of suppressing the head squeak, vibration insulators are disposed at fore ends of the support pins 11 and 12 and the gimbal springs 7 and 8 are supported through the vibration insulators to dampen the undulating phenomenon of the square frame "b" and suppress the resonance in the audible range. However, this method has not been so effective for the gimbal spring 8 on the side of the movable base 2. This is presumed to be for the following reason. Since the fixed base 1 is integral with the disc driving apparatus through a guide rod (not shown), an increased mass causes drop in resonance frequency of the gimbal spring 7 on the side of the fixed base 1, resulting in that the resonance is difficult to appear as an audible sound, while the movable base 2 is mounted on the side of the fixed base 1 through the spring 4, so a small mass allows the vibration of the gimbal spring 8 to be transferred also to the movable base 2, resulting in that the gimbal spring 8 and the movable base 2 may resonate in the audible range despite of interposition of the vibration insulator.

For excluding the resonance of the gimbal spring 8 on the side of the movable base 2, there has been proposed a construction in which a damper, also called a dynamic damper, is attached to the movable base 2 and the phase of the movable base 2 and that of the dynamic damper are shifted from each other by a predetermined amount to prevent resonation. However, this method has not been a preferable solution because excess mass is applied to the movable base 2 and it may affect the follow-up performance of the magnetic head

SUMMARY OF THE INVENTION

The present invention has been effected in view of the above-mentioned circumstances of the prior art and it is the object thereof to provide a magnetic head assembly capable of suppressing the head squeak without the provision of any special additional member.

According to the present invention, in order to achieve the above object, there is provided a magnetic head assembly including a carriage which carries thereon a first magnetic head for writing and reading information with respect to the face of one side of a magnetic recording medium formed in the shape of a disc, and a hold case which carries thereon a second magnetic head for writing and reading information with respect to the face of the other side of the magnetic recording medium and which is connected to the carriage somewhat rotatably through hinge means such as, for example, a leaf hinge spring, the magnetic head assembly being reciprocated in a radial direction of the magnetic recording medium, the first magnetic head being mounted on the carriage through a gimbal spring which is formed somewhat rotatably and independently with respect to two axes, one extending in the radial direction of the magnetic recording medium and the other extending in a tangential direction of information tracks perpendicular to the radial direction, the second magnetic head being carried on the hold case through a spring plate which is formed somewhat rotatably with respect to one axis perpendicular to the radial direction of the magnetic recording medium, that is, extending in the tangential direction of information tracks, and in which magnetic head assembly a base end portion on the mounting side of the hold case to the carriage where the leaf hinge spring is provided, is held in pressure contact with the carriage side.

In the above construction, since the second magnetic head is supported by the spring plate which is allowed to rotate only with respect to one axis in the tangential direction of information tracks, the development of distortion in the said tangential direction is prevented which distortion is caused by a frictional force between the magnetic head and the disc, thus resulting in that the vibration of the spring plate (in the prior art a gimbal spring having a bidirectionally rotatable shaft) which has been caused by such distortion is diminished to a remarkable extent. In addition, since the hold case which carries the second magnetic head thereon is brought into pressure contact with the carriage side, the vibration system of the hold case and that of the carriage are rendered integral and the resonance frequency of the hold case can be lowered thereby, so that the hold case scarcely resonates under the vibration of the gimbal spring, thus suppressing the generation of resonance sound in the audible range.

BRIEF DESCRIPTION OF THE DRAWINGS

FIGS. 1 to 8 illustrate an embodiment of the present invention, of which:

FIGS. 9 and 10 illustrate a conventional example, of which:

DESCRIPTION OF A PREFERRED EMBODIMENT

An embodiment of the present invention will be described in detail hereinunder with reference to the drawings.

Figure 1:
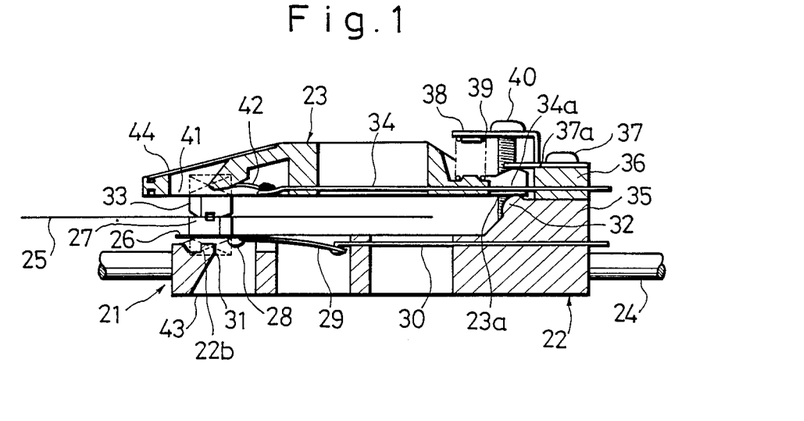
FIG. 1 is a sectional view of a magnetic head assembly embodying the invention.

In FIG. 1, a magnetic head assembly 21 is mainly composed of a carriage 22 corresponding to the fixed base 1 in the prior art and a hold case 23 corresponding to the movable base 2 in the prior art. It is moved in a radial direction of a disc 25 along a guide rod 24 by means of a pulse motor 63 shown in FIG. 4.

A lower magnetic head 27 is mounted on a fore end portion of the carriage 22 through a gimbal spring 26, and the carriage 22 is provided with a flexible printed circuit board 29 connected with a lead wire 28 extending from the magnetic head 27, and also provided with a lead terminal 30 projecting toward a base end of the carriage 22. The lead terminal 30 has been obtained by dividing a metallic plate of good conductivity into five parts followed by insert molding using an insulating synthetic resin material, one end of the lead terminal 30 extending up to a position near the gimbal spring 26. The carriage 22 formed by molding is further provided with a pivot 31 which is in abutment with a lower surface of the magnetic head 27 mounting portion of the gimbal spring 26 to ensure the abutment with the disc 25, and a support portion 32 having a cylindrical abutting face for direct abutment with the later-described hold case 23 to support the latter.

The hold case 23 is attached to a base portion 35 of the carriage 22 through a retaining plate 36 and a leaf hinge spring 34 which supports the hold case 23 rotatably relative to the retaining plate 36. An upper magnetic head 33 is fixed through a spring plate 41 to the hold case 23 in a position opposed to the lower magnetic head 27 on the side of the carriage 22. Further, a load spring 39 stretched from a retaining plate 38 is in abutment with the hold case 23 to urge the latter toward the carriage 22. This urging force can be adjusted to an optimum value with a load pressure adjusting screw 40 attached to the retaining plate 38.

Figure 2:
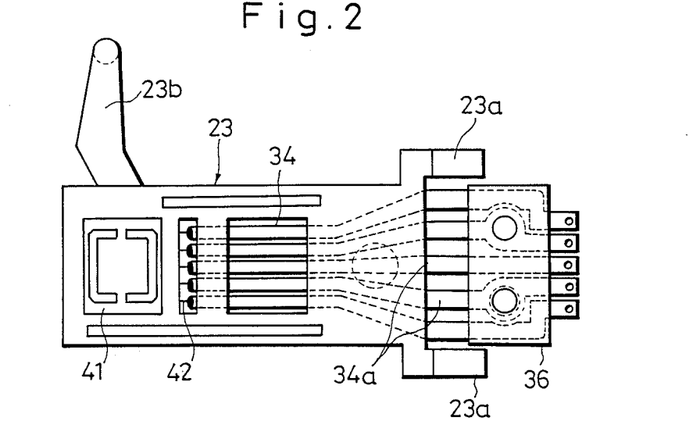
FIG. 2 is a plan view of a hold case.

For example, as shown in FIG. 2, the leaf hinge spring 34 provided on the hold case 23 is formed by insert-molding a single spring material of good conductivity and cutting the resulting molded product into a desired shape. The leaf hinge spring 34 positioned at one end near the spring plate 41 is divided in five, for example, and five lead wires 42 extending from the magnetic head 33 which is secured to the spring plate 41 with an adhesive, are connected to five end portions of the leaf hinge spring 34, thus functioning also as lead terminals. Out of the five lead wires, three are for reading and writing and two for erasing. To serve also as lead terminals, the leaf hinge spring 34 is divided in five. Further, shield plates 43 and 44 are attached to the lower surface of the lower magnetic head 27 mounting portion and the upper surface of the upper magnetic head 33 mounting portion, respectively, to suppress noise.

The hold case portion in abutment with the support portion 32 of the carriage 22 is projecting sideways of hinge portions 34a of the leaf hinge spring 34 to form bearing portions 23a and the hold case 23 is rotatable along the cylindrical face of the support portion 32. Therefore, the vertical position of the hold case 23 is defined by the height of the abutting part of the support portion 32, the mounting height of the retaining plate 36 for the leaf hinge spring 34 and the mounting height of the retaining plate 36 relative to the base portion 35 of the carriage 22. Thus, the height of the retaining plate 36 from the support portion 32 is set to an optimum level and in this state it is fixed to the base portion 35 with the mounting bolts 37. Pressing plates 37a projecting above the bearing portions 23a are for pressing the hold case 23 toward the carriage 22 to make integral the vibration system of the hold case 23 and that of the carriage 22, thereby suppressing the resonance of the hold case 23. The reference numeral 23b in FIG. 2 denotes an arm. Through this arm 23b the hold case 23 can be moved toward and away from the carriage 22.

Figure 3:
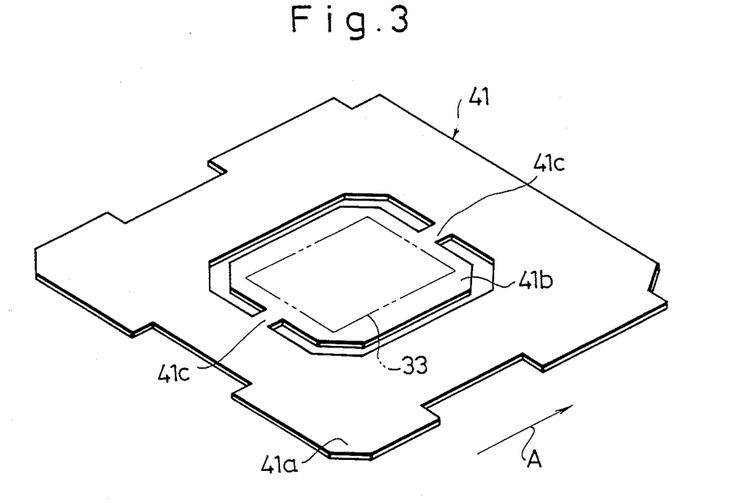
FIG. 3 is a perspective view of a spring plate attached to the hold case.

The spring plate 41 mounted on the side of the hold case 23 comprises an outer frame portion 41a whose outer peripheral part is fixed to the hold case 23, and a head fixing portion 41b which is located inside the outer frame portion 41a and to which is fixed the magnetic head 33, as shown in FIG. 3. The outer frame portion 41a and the head fixing portion 41b are centrally interconnected integrally through a pair of narrow hinge portions 41c extending in the tangential direction (arrow A) of the information tracks of the magnetic disc 25, and they are formed integrally using a thin metallic plate, e.g. stainless steel or phosphor bronze, having a thickness of about 50 μm. Under such construction, the head fixing portion 41b as a movable part of the spring plate 42 will never undergo vibration which is caused by a distortion in the tangential direction of the information tracks induced by a frictional force between the magnetic head 33 and the disc 25.

Figure 4:
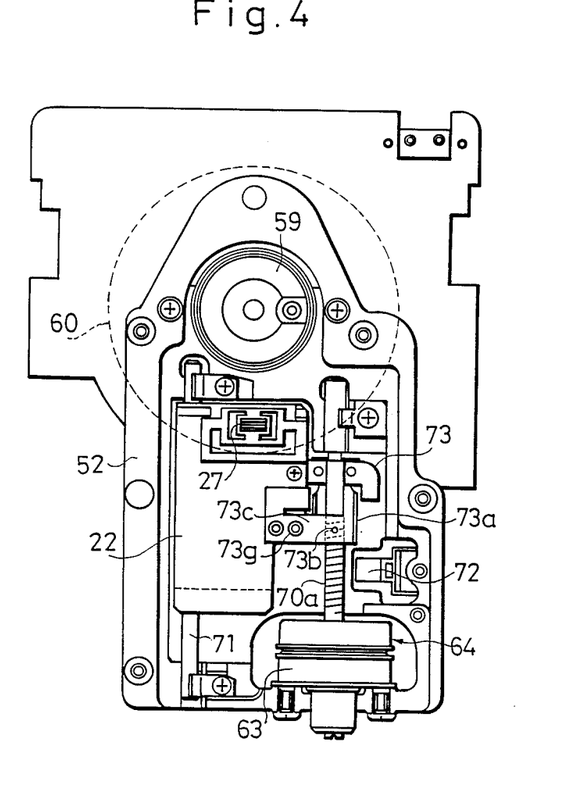
FIG. 4 is a plan view of a housing provided with a carriage moving mechanism.

The magnetic head assembly 21 constructed as above can be moved in the radial direction of the disc 25 through a carriage moving device 64 mounted on a housing 52, as shown in FIG. 4. The housing 52 is formed separately from a frame (not shown) and on its upper surface there are provided a motor 60 having a turntable 59; a stepping motor 63 for rotating a screw shaft 70 formed with thread grooves 70; the carriage 22 which is engaged at one side with the thread grooves 70a through an engaging member 73, supported at an opposite side by a guide rod 71 and slides on the same rod; and a "0" track sensor 72 for detecting a "0" track position on the disc 25 of the magnetic head 27 provided at the fore end of the carriage 22. The engaging member 73 which engages the thread grooves 70a of the screw shaft 70 at one side of the carriage 22 is constituted by a tip portion 73b which is in direct engagement with the thread grooves 70a on the fore end side of a leaf spring 73a, and a holding portion 73c for holding the screw shaft 70 opposedly to the tip portion. Together with the guide rod 71 the engaging member 73 defines the height of the carriage 22. The carriage 22 and the stepping motor 63 having the screw shaft 70 which drives the carriage, constitute the carriage moving mechanism 64.

The construction of the moving mechanism 64 will be described below in more detail.

Figure 5:
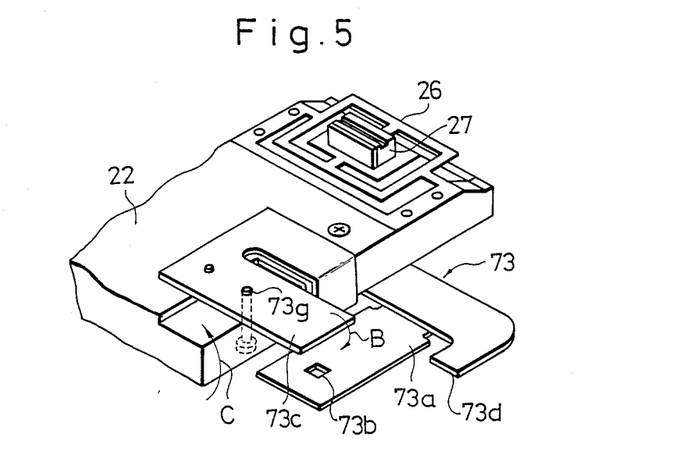
FIG. 5 is a perspective view of a principal portion of a carriage, explanatory of a carriage adjusting mechanism.
Figure 6:
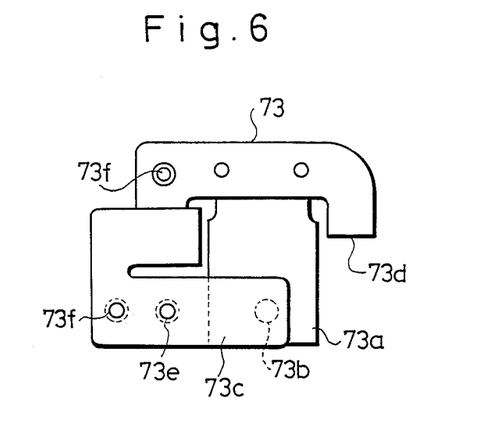
FIG. 6 is a plan view of an engaging member.
Figure 7:
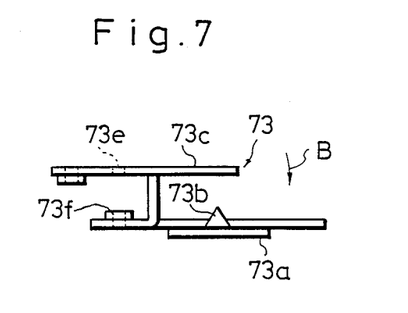
FIG. 7 is a front view thereof.

In FIGS. 6 and 7, the engaging piece 73 made of a thin metallic plate is bent so that the tip portion 73b projecting from the plate spring 73a and the holding portion 73c can be opposed to each other as mentioned above. It is fixed to one side portion of the carriage 22 through mounting holes 73f which are formed in upper and lower members, respectively, in FIG. 7. As shown in FIG. 5, an adjusting screw 73g is threadedly fitted from the lower surface side of the carriage 22 into a threaded hole 73e which is formed in the upper member, and the tip portion 73b engages the thread grooves 70a formed on the screw shaft 70 which is rotated by the stepping motor 63, to thereby convert the rotational motion of the stepping motor 63 into a linear motion. The screw shaft 70 is held between the tip portion 73b and the holding portion 73c. Therefore, the carriage 22 is vertically positioned by both the guide rod 24 which supports the opposite side of the carriage 22 slidably, and the engaging member 73. With forward and reverse rotation of the stepping motor 63, the carriage 22 is reciprocated along a movement plane defined by both the screw shaft 70 and the guide rod 24. In this embodiment, an accurate parallelism of the carriage 22 relative to the rotating surface of the disc can be attained using the adjusting screw 73g. But in this example, the adjustment can be done only within the range in which the holding portion can be deformed in the direction of arrow B in FIGS. 5 and 8 by tightening of the adjusting screw 73g. At this time, the carriage 22 turns in the direction of arrow C in FIG. 5 and thus it is possible to adjust its inclination only in one direction relative to the rotating surface of the disc. As to the adjusting mechanism using the adjusting screw 73g, various modifications can be made, which should be selected according to the type of the carriage moving mechanism and the adjusting angle required. A shutter portion 73d of the engaging member 73 is loosely inserted between gears (not shown) of the "0" track sensor 72 and fulfills a "0" track sensing function.

Figure 8:
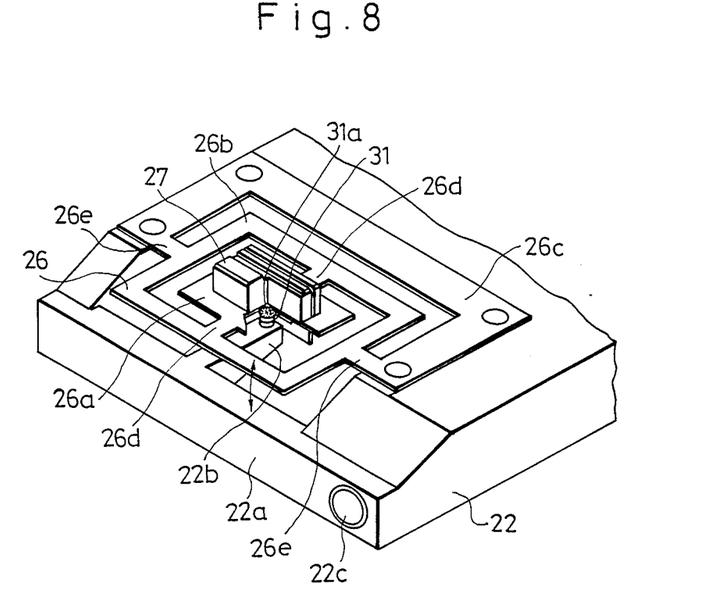
FIG. 8 is a perspective view of principal components of a fore end portion of the carriage.

The gimbal spring 26 fixed to the upper surface of the fore end portion of the carriage 22 comprises, as shown in FIG. 8, a square portion 26a to which the magnetic head 27 is attached, a square frame 26b positioned as a peripheral edge portion outside the square portion 26a, and a mounting frame 26c for mounting the gimbal spring 26 to the upper surface of the carriage 22. The square portion 26 and the square frame 26b are interconnected through hinge portions 26d in the radial direction of the disc 25, while the square frame 26b and the mounting frame 26c are interconnected through hinge portions 26e in a tangential direction (perpendicular to the said radial direction) of the information tracks of the disc 25. These constituent portions are formed integrally using a spring material. As to the mounting frame 26c, there remains only a rear half portion required for mounting the gimbal spring to the carriage 22. The fore end portion 22a (on the side of the turntable 59) of the carriage 22 is cut off obliquely and the fore end portion of the square frame 26b of the gimbal spring 26 is spaced from the upper surface of the fore end portion 22a of the carriage 22 and thus capable of rocking with respect to the hinge portions 26e. Moreover, the fore end portion 22a is slightly projecting relative to the fore end portion of the square frame 26b, as shown in FIG. 1, to prevent the gimbal spring 26 from abutting the housing 52 during the movement toward the turntable 59.

The pivot 31 provided on the carriage 22 for supporting the gimbal spring 26 from the back of the magnetic head 27 is projecting toward the gimbal spring 26 from a support arm 22b which projects from the fore end portion 22a of the carriage 22 toward a rear end side thereof. The pivot 31 thus projecting from the support arm abuts the back of the square portion 26a of the gimbal spring 26 through a vibration insulator 31a to suppress the vibration of the same spring and at the same time suppress the transfer of the vibration to the carriage. A hole 22c is exposed to the fore end portion 22a as shown in FIG. 8. This is a guide hole for insertion therein of the guide rod 24, with a metal being fitted therein along the inner surface of the hole.

In the magnetic head assembly constructed as above, the gimbal spring 26 on the side of the carriage 22 has the hinge portions 26d and 26e in the radial direction of the disc 25 and in the direction perpendicular thereto, so even if resonance of the gimbal spring 26 is developed during information recording or reproduction, it is damped by the vibration insulator 31a provided at the fore end of the pivot 22b and thus difficult to be developed in the audible range. Moreover, since the carriage 22 with the gimbal spring 26 attached thereto is made integral with the housing 52 through the guide rod 24, the mass in the vibration system is increased, thus contributing to preventing resonance from being generated in the audible region.

In the above embodiment, moreover, since the spring plate 41 oh the side of the hold case 23 is formed with the hinge portions 41c only in the tangential direction of the information tracks of the disc 25 thereby permitting it to rotate to a certain degree relative to the hinge portions 41c, there is no fear of the spring plate 41 being deformed which is caused by the frictional force between the magnetic head 33 and the disc 25. Additionally, since the hold case 23 is urged toward the carriage 22, there is no fear of an independent resonance of the hold case 23, and the vibration system of the hold case 23 and that of the carriage 22 and housing 52 become integral and the mass is thereby increased; as a result, there is little fear of resonance in the audible region.

According to the above embodiment, the adjusting screw 73g for adjusting the parallelism of the carriage 22 relative to the disc rotating surface is provided in the carriage moving mechanism, whereby the final adjustment of parallelism can be done easily and accurately.

Additionally, the fore end portion 22a of the carriage 22 is shortened and cut off obliquely, while the front half portion of the mounting frame 26c is omitted and only its rear half portion is attached to the carriage 22, whereby a sufficient carriage moving stroke is ensured, and by slightly projecting the fore end portion 22a of the carriage 22 relative to the fore end of the square frame 26b of the gimbal spring 26, it is possible to attain protection of the gimbal spring 22 during the carriage movement.

As is apparent from the above description, according to the present invention in which the spring plate on the hold case side is constructed rotatably to a certain degree only in the radial direction of the disc and the hold case is urged toward the carriage, not only the spring plate itself is difficult to resonate in the audible region, but also there is no fear of the hold case being resonated in the audible region by the vibration transferred thereto from the spring plate because its vibration system is set integral with that of the carriage side. It is possible to effectively suppress the occurrence of the head squeak even without using any special additional member.

What is claimed is:

1. A magnetic head assembly for reading and writing information on concentric tracks of a double-sided magnetic recording disk, comprising:

a carriage extending longitudinally between forward and rear ends thereof, said carriage being reciprocally movable in a radial direction of the disk and carrying a lower magnetic head at its forward end for reading and writing information on a lower side of the disk;

a hold case extending longitudinally between forward and rear ends thereof and having its rear end pivotally connected through hinge means to the rear end of said carriage such that said hold case is reciprocally movable with said carriage, wherein said forward end of said hold case is pivotably biased toward the forward end of the carriage and carries an upper magnetic head for reading and writing information on an upper side of the disk, said upper magnetic head being disposed opposite to said lower magnetic head when said forward end of said hold case is pivoted toward said forward end of said carriage;

said lower magnetic head being mounted on said forward end of said carriage through a gimbal spring which has first and second hinge portions allowing said lower magnetic head to be rotatable biaxially on a first axis aligned with said radial direction of the disk and on a second axis in a perpendicular direction tangential to the tracks on the disk, respectively;

said upper magnetic head being mounted on said forward end of said hold case through an upper spring plate which has a hinge portion allowing said upper magnetic head to be rotatable uniaxially only on one axis aligned with said perpendicular direction tangential to the tracks on the disk; and biasing means for pivotably biasing said forward end of said hold case toward said forward end of said carriage, wherein said hinge means includes a leaf hinge spring having one end portion mounted to said carriage and another end portion fixed to aid rear end of said hold case, said carriage includes a support portion on which a lower surface of said rear end of said hold case is abutted, and said biasing means includes a load spring mounted from said rear end of said carriage for biasingly pressing in a downward direction on said rear end of said hold case, and a pressing plate mounted from said rear end of said carriage projecting above and abutting an upper surface of said rear end of said hold case for pressing said hold case toward the carriage at said rear end thereof and making any vibration of said hold case due to deflections of said only uniaxially rotatable upper head integral with said carriage, thereby suppressing the resonance of said hold case.

2. A magnetic head assembly according to claim 1, wherein said gimbal spring comprises a square portion to which said lower magnetic head is attached, a square frame positioned as a peripheral edge portion outside said square portion, and a mounting frame for mounting the gimbal spring to an upper surface of the carriage, said square portion and said square frame being interconnected through said hinge portion provided in the radial direction of the magnetic recording medium, and said square frame and said mounting frame being interconnected through said hinge portion provided in said tangential direction of information tracks.

3. A magnetic head assembly according to claim 2, wherein said forward end of said carriage is cut off obliquely and it is slightly projecting relative to a fore end portion of said square frame.

4. A magnetic head assembly according to claim 1, wherein a pivot is provided on said carriage, said pivot supporting said gimbal spring from the back of said lower magnetic head through a vibration insulator.

5. A magnetic head assembly according to claim 1, wherein said spring plate comprises an outer frame portion whose outer peripheral part is fixed to said hold case, and a head fixing portion provided inside said outer frame portion, with said upper magnetic head being fixed to said head fixing portion.

* * * * *